2 Sheets--Sheet 1.

NELSON BURR.

Improvement in Grinding Mills.

No. 4,741. Reissued Feb. 6, 1872.

Witnesses.

J. S. Dennis
R. D. Smith

Inventor.

Nelson Burr
by Lewis L. Colburn
Atty

2 Sheets--Sheet 2.

NELSON BURR.

Improvement in Grinding Mills.

No. 4,741. Reissued Feb. 6, 1872.

Witnesses.

J. S. Dennis
R. D. Smith

Inventor.

Nelson Burr
by Lewis L. Coburn
Atty

UNITED STATES PATENT OFFICE.

NELSON BURR, OF BATAVIA, ILLINOIS.

IMPROVEMENT IN GRINDING-MILLS.

Specification forming part of Letters Patent No. 29,462, dated August 7, 1860; reissue No. 4,741, dated February 6, 1872.

DIVISION A.

SPECIFICATION (A.)

*To all whom it may concern:*

Be it known that I, NELSON BURR, of Batavia, in the county of Kane and State of Illinois, have invented certain new and useful Improvements in Portable Mills; and I do hereby declare the following to be a full, clear, and exact description of the same, reference being had to the accompanying drawing and to the letters of reference marked thereon, in which—

Figure 2:
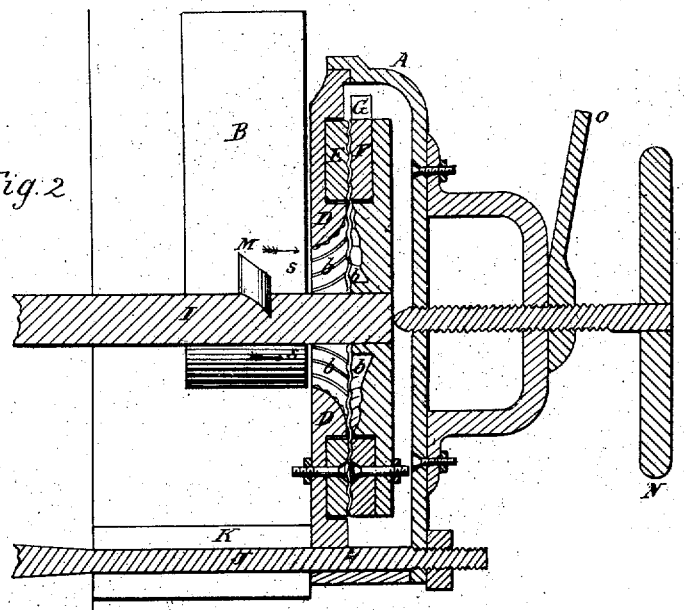
Figure 1:
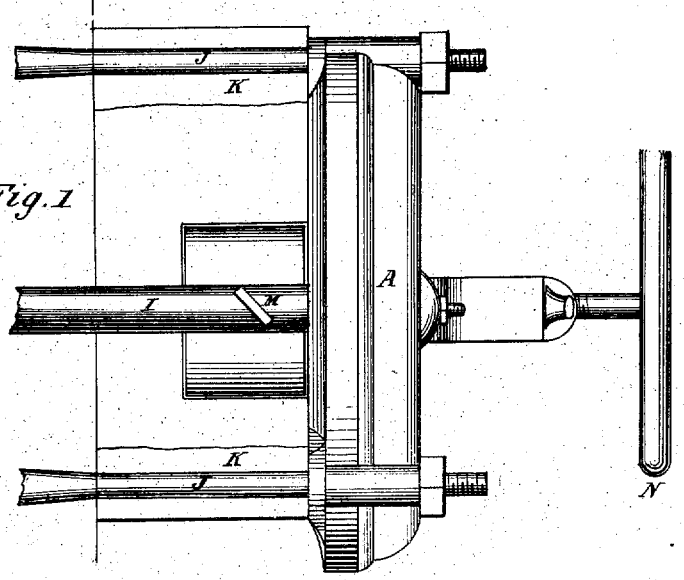
Figure 3:
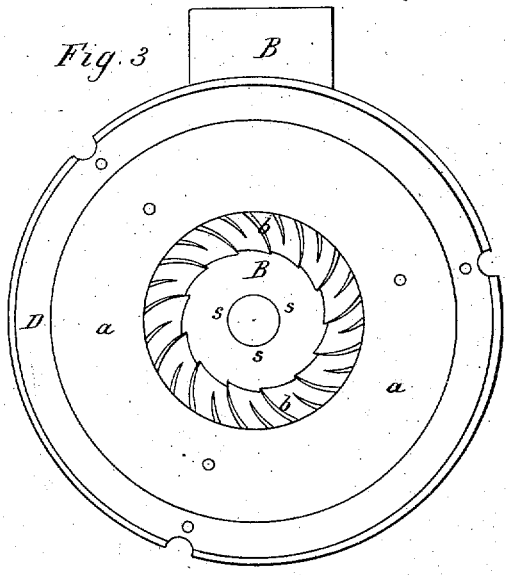
Figure 4:
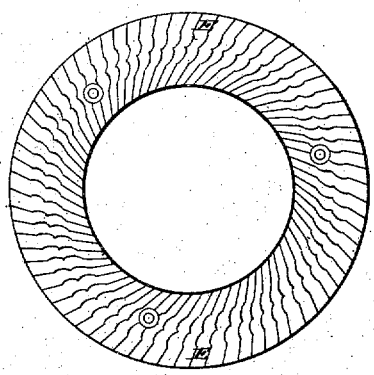
Figure 5:
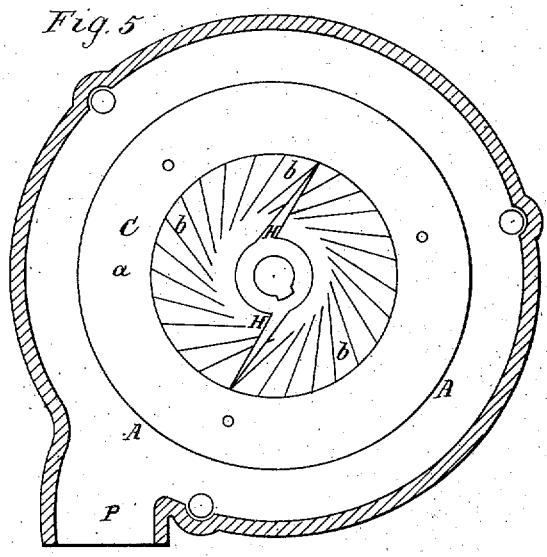
Figure 6:
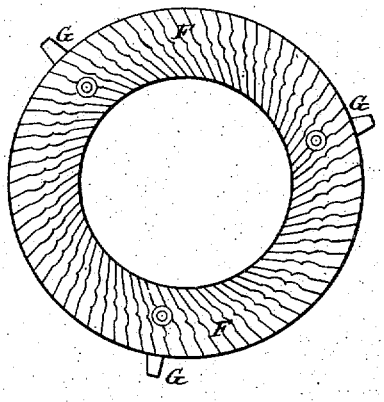

Figure 1 is a side elevation; Fig. 2, a sectional view; Fig. 3, an inside view of the stationary plate; Fig. 5, an inside view of the revolving plate lying in the shell. Figs. 4 and 6 represent the rings or grinding-surfaces.

The nature of my invention consists in constructing the grinding-rings or surfaces and the revolving and stationary plates so that the wear of the grinding is all upon the said rings, which fit into chambers in the said plates, and are detachable, so that they may be readily removed when worn out; also, in the employment and arrangement of other devices, the peculiarities of which will be hereinafter fully described.

To enable others skilled in the art to make and use my invention, I will now describe its construction and operation.

A represents the shell or outside covering to the two plates. B is the grain-receiver or hopper. D is the stationary plate; and *c*, the revolving plate. I is a shaft which passes through the lower portion or receiver B; also, through the stationary plate D, and is secured to the revolving plate *c*. *m* is a spiral wing on the shaft I, inside the receiver B, for the purpose of agitating and conveying the grain through the opening S in the stationary plate, and from thence to the grinding-surfaces by the drift *b*. *a* are circular chambers in both the stationary and revolving plates. E and F are rings or grinding-surfaces, which may be taken out and replaced in the chamber *a* as often as they become dull or worn out at a very small expense. H H represent wings in the drift on the revolving plate C, for the purpose of gathering the grain before it enters the grinding-surfaces. N is the regulating-gauge, provided with the thumb-screw *o*, for the purpose of holding the gauge to its proper place.

The operation of my machine is as follows: The grain is placed into the receiver B, and is agitated according to the velocity of the shaft I by the wing *m* being conveyed through the openings S; thence to the grinding-surfaces E F, it is ground either coarse or fine, as you have regulated the plates, and then discharged at the spout P.

It will be seen that in constructing a mill, as set forth above, I entirely overcome the objection so much urged against iron mills—to wit—the great expense necessary to keep them in repair.

My rings or grinding-surfaces may be replaced whenever worn out for a very small sum, thus rendering the mill in all respects as good as when first purchased; and as it is designed to grind either flour, meal, or feed for horses, it will be found to possess great advantage for grinding use.

I am aware that grinding-mills showing detachable metallic grinding-rings have been invented; but they are attached to plates or backings constructed in conical form, and so arranged that one revolves within the other, and they are provided with grinding-surfaces which partly grind the grain before it reaches the rings. These mills have the disadvantage of their conical surfaces rubbing against each other in case the gearing of the mill does not run perfectly true, and the mill soon becomes useless.

The plates or backings C and D in my mill are made concave to each other, and have no grinding-surfaces. They simply receive the grain and carry it to the grinding-rings E and F, which do the entire grinding. The mill itself may last for years, it being necessary to renew only the grinding-rings E and F to renew the whole grinding-surface and make the mill as good as new.

I prefer to provide the backing-plates C and D with drifts and guides to assist in carrying the grain to the grinding-rings, and I have claimed them in "division B" of this reissue; but it will be observed that, so far as the above objects are concerned, they may be dispensed with.

Having thus fully described my invention, what I claim, and desire to secure by Letters Patent, is—

The combination, in a portable grinding-mill, of the backing-plates C and D, made concave to each other, and the detachable metallic grinding-rings E and F, attached to the backing-plates, substantially as and for the purposes specified.

NELSON BURR.

Witnesses:
GEO. G. LYON,
WM. D. NICHOLS.